United States Patent
Karner et al.

(10) Patent No.: US 9,975,511 B2
(45) Date of Patent: May 22, 2018

(54) CONTROL DEVICE OF AN ELECTROMAGNETIC ACTUATOR FOR A RESTRAINT MEANS

(71) Applicant: Robert Bosch GmbH, Stuttgart (DE)

(72) Inventors: Ruediger Karner, Kornwestheim (DE); Hartmut Schumacher, Freiberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/310,410

(22) PCT Filed: Jun. 1, 2015

(86) PCT No.: PCT/EP2015/062078
§ 371 (c)(1),
(2) Date: Nov. 10, 2016

(87) PCT Pub. No.: WO2015/185477
PCT Pub. Date: Dec. 10, 2015

(65) Prior Publication Data
US 2017/0158152 A1    Jun. 8, 2017

(30) Foreign Application Priority Data

Jun. 5, 2014  (DE) .................. 10 2014 210 810

(51) Int. Cl.
*B60R 21/017*  (2006.01)
*H01F 7/18*  (2006.01)
(Continued)

(52) U.S. Cl.
CPC .......... *B60R 21/017* (2013.01); *B60R 21/268* (2013.01); *H01F 7/1805* (2013.01);
(Continued)

(58) Field of Classification Search
CPC . B60R 2021/01184; B60R 2021/01231; B60R 2021/26094; B60R 21/017; B60R 21/268; H01F 7/1805
(Continued)

(56) References Cited

U.S. PATENT DOCUMENTS 4,291,358 A    9/1981 Dettmann et al.
4,700,357 A *  10/1987 Ast .................. H04L 25/4917
                                            375/214
(Continued)

FOREIGN PATENT DOCUMENTS

DE    4041049 A1    7/1992
DE   10107273 A1    8/2002
(Continued)

OTHER PUBLICATIONS

International Search Report dated Sep. 10, 2015, of the corresponding International Application PCT/EP2015/062078 filed Jun. 1, 2015.

*Primary Examiner* — Tyler J Lee
(74) *Attorney, Agent, or Firm* — Norton Rose Fulbright US LLP; Gerard Messina

(57) ABSTRACT

A control device of an electromagnetic actuator for a restraint device, including an evaluation and control unit which generates a control signal which predefines a control sequence having control time periods, in which the actuator is activated, and pause time periods, in which the actuator is deactivated. A protective circuit including a counter is provided, the counter monitoring the control sequence and increments its counter content during the at least one control time period and decrements its counter content during the at least one pause time period, the protective circuit effectuating a deactivation of the actuator when the counter content reaches or exceeds a predefined first threshold value, and allows a reactivation of the actuator when the counter (Continued)

content reaches or falls below a predefined second threshold value after reaching or exceeding the first threshold value, the first counter content being greater than the second counter content.

10 Claims, 2 Drawing Sheets

(51) Int. Cl.
*B60R 21/268* (2011.01)
*B60R 21/01* (2006.01)
*B60R 21/26* (2011.01)

(52) U.S. Cl.
CPC ............... *B60R 2021/01184* (2013.01); *B60R 2021/01231* (2013.01); *B60R 2021/26094* (2013.01)

(58) Field of Classification Search
USPC ....................................................... 701/36–45
See application file for complete search history.

(56) References Cited

U.S. PATENT DOCUMENTS

| | | | | |
|---|---|---|---|---|
| 5,400,487 A | * | 3/1995 | Gioutsos | B60R 21/01534 180/282 |
| 5,820,162 A | * | 10/1998 | Fink | B60R 21/205 137/68.13 |
| 5,927,753 A | * | 7/1999 | Faigle | B60R 21/268 280/735 |
| 6,123,358 A | * | 9/2000 | Ryan | B60R 21/276 280/739 |
| 2003/0213518 A1 | * | 11/2003 | Zielinski | B60P 7/065 137/223 |
| 2007/0019356 A1 | * | 1/2007 | Morikawa | F16K 31/0603 361/160 |
| 2014/0326320 A1 | * | 11/2014 | Wellhoefer | B60R 21/263 137/1 |
| 2015/0014972 A1 | * | 1/2015 | Schumacher | B60R 21/017 280/735 |
| 2015/0115747 A1 | * | 4/2015 | Balz | B60R 21/0173 307/326 |

FOREIGN PATENT DOCUMENTS

| | | |
|---|---|---|
| DE | 10304142 A1 | 8/2004 |
| DE | 102005033918 A1 | 1/2007 |
| DE | 102011087077 A1 | 5/2013 |
| WO | 0247049 A1 | 6/2002 |

\* cited by examiner

CONTROL DEVICE OF AN ELECTROMAGNETIC ACTUATOR FOR A RESTRAINT MEANS

FIELD

The present invention is directed to a control device of an electromagnetic actuator for a restraint device.

BACKGROUND INFORMATION

Electromagnetic actuators are being used more and more, to an increasing extent, in restraint devices for vehicles. Be it for activating rollover bars, headrests, or as a valve for cold gas generators. In the case of the valves for cold gas generators, it is frequently required that the corresponding airbags not be inflated all at once, but rather that the inflation of the airbags be adapted to the accident occurrence and the person to be protected, and that the airbags be filled more rapidly or more slowly. For this purpose, the gas supply is controlled over a certain period of, for example, approximately 50 ms, with an appropriate sequence of filling times and pause times.

German Patent Application No. DE 101 07 273 A1 describes a safety device for occupants of a vehicle and a method for controlling the safety device. The safety device includes at least one airbag which is fillable with a defined quantity of gas, a unit for supplying the quantity of gas to the airbag, and a control unit for activating the safety device. In this case, the instantaneous internal airbag pressure is controlled as a function of a vehicle deceleration and the progress of the internal airbag pressure over time.

A device and a method for controlling a continuous gas generator for inflating an airbag are described in German Patent Application No. DE 103 04 142 A1. In this case, the gas generator is controlled as a function of a linkage of crash features. In this case, in particular, a variable threshold is formed as a function of a crash severity and occupant characteristics. The device includes an electromagnetic actuator and an evaluation and control unit which generates at least one control signal as a function of a triggering decision which was reached, the control signal determining the chronological sequence of the control of the actuator and predefining a control sequence having at least one control time period, in which the actuator is activated, and at least one pause time period, in which the actuator is deactivated.

SUMMARY

The control device of an electromagnetic actuator for a restraint device, according to the present invention may have the advantage over the related art in that existing ignition output stages for pyrotechnical restraint devices may be used for the control of such an electromagnetic actuator and that the surface requirement and, therefore, the costs for new control stages to be developed may be minimized by monitoring the power loss in the control device. Due to the integrated counter which deactivates the electromagnetic actuator when a predefined threshold value is reached, the risk of a thermal overload of the control device may be advantageously substantially reduced. In addition, the control device is thermally relieved in the switched-off state of the electromagnetic actuator.

Specific embodiments of the present invention provide a control device of an electromagnetic actuator for a restraint device including an evaluation and control unit which generates at least one control signal as a function of a triggering decision which was reached, the control signal determining the chronological sequence of the control of the actuator and predefining a control sequence having at least one control time period, in which the actuator is activated, and at least one pause time period, in which the actuator is deactivated. According to the present invention, a protective circuit including a counter is provided, the counter monitoring the control sequence and increments its counter content during the at least one control time period and decrements its counter content during the at least one pause time period, the protective circuit effectuating a deactivation of the actuator when the counter content reaches or exceeds a predefined first threshold value, and allows a reactivation of the actuator when the counter content reaches or falls below a predefined second threshold value after reaching or exceeding the first threshold value. In this case, the first counter content is greater than the second counter content.

Due to the measures and refinements described herein, advantageous improvements on the control device of an electro-magnetic actuator for a restraint device described herein are possible.

It is particularly advantageous that the at least one control time period may correspond to one pulse duration or one dwell time duration. As a result, a control of the electromagnetic actuators in three phases is possible. In a first phase, the evaluation and control unit may generate a pulse-shaped actuator current, which activates the actuator, with the aid of a first control signal. This means that the electromagnetic actuator may be activated by a high, short current pulse. In a second phase, the evaluation and control unit may generate, with the aid of a second control signal, an essentially constant actuator current having a predefined value when the pulse-shaped actuator current reaches a predefined first threshold value. The constant actuator current may hold the actuator in the activated state. This means that the electromagnetic actuator may be held in the activated state with the aid of a constant holding current which corresponds to approximately 10%-20% of the amplitude of the activation current pulse. In a third phase, the evaluation and control unit may deactivate the actuator with the aid of a third control signal. This means that the electromagnetic actuator may be deactivated by switching off the holding current. Due to the first phase, a rapid activation of the electromagnetic actuator may be advantageously ensured. The output stage is turned on with a minimal on-resistance or a minimal forward resistance. As a result, the minimum possible power loss in the control device is generated, since the inductor of the electromagnetic actuator decelerates the current increase and, therefore, the electromagnetic actuator absorbs the power loss. When a defined current threshold value is reached, a switchover to the second phase takes place, the second phase representing an energy-saving retention of the desirable activated state of the electromagnetic actuator. This takes place by limiting the current of the output stage to the holding current of the electromagnetic actuator. In the third phase, the electromagnetic actuator is switched off, in order to thermally relieve the control device. The evaluation and control unit may generate the different actuator currents, for example, via two switches which generate different control currents for the output stage via two different ohmic resistors, the actuator being deactivatable via a further switch. The implementation using switches provides for a simple and cost-effective design of the control device of an electromagnetic actuator for a restraint device according to the present invention. Of course, those skilled in the art may implement suitable technical approaches other than switches for generating different actuator currents; for example, different current sources, which are preferably formed by current mirrors, may also be used for generating the different actuator currents.

In one further advantageous embodiment of the control device according to the present invention, the counter may increment the counter content during the pulse duration by a predefined first counting stage and, during the dwell time duration, by a predefined second counting stage which is smaller than the first counting stage. The first counting stage may be dependent, for example, on the predefined first threshold value of the pulse-shaped actuator current. The second counting stage may be dependent on the predefined value of the constant actuator current. In addition, the counter may decrement the counter content during the pause duration by a predefined third counting stage. The third counting stage may be dependent, for example, on the thermal resistance and/or on the instantaneous temperature of the control device. The counter is installed for monitoring the load of the control device. The value of the counter is incremented or decremented in predefined stages in one fixed time interval, as a function of the present phase. When a certain terminal value is reached, the stage is then automatically switched off. This counter is activated in accordance with the three phases. During the first phase, the counter is incremented by one high first counting stage. During the second phase, the counter is incremented by a smaller second counting stage, the ratio of the second counting stage to the first counting stage preferably corresponding to the ratio of the constant holding current to the amplitude of the activation pulse current. In this way, the first counting stage in the first phase may have a value, for example, of 20, so that the second counting stage in the second phase has a value of 2 when the holding current has a value of approximately 10% of the amplitude of the activation pulse current. During the third phase, the third counting stage for decrementing the counter content is selected in accordance with the possible thermal cooling.

In one further advantageous embodiment of the control device according to the present invention, the electro-magnetic actuator may be designed as a solenoid valve, via which a restraint means designed as an airbag is fillable with a cold gas. The number of the activating time periods and the pause time periods within one predefined period may be predefined as a function of the desirable filling capacity of the airbag per unit of time. In order to inflate the airbag with the desirable filling capacity per unit of time, a permissible sequence of filling times and pause times is predefined, as a function of the design of the output stage, having a certain number of filling times and pause times within a certain period.

One exemplary embodiment of the present invention is represented in the figures and is described in greater detail below. In the figures, the same reference numerals label components or elements which carry out identical or similar functions.

DETAILED DESCRIPTION OF EXAMPLE EMBODIMENTS

Figure 1:
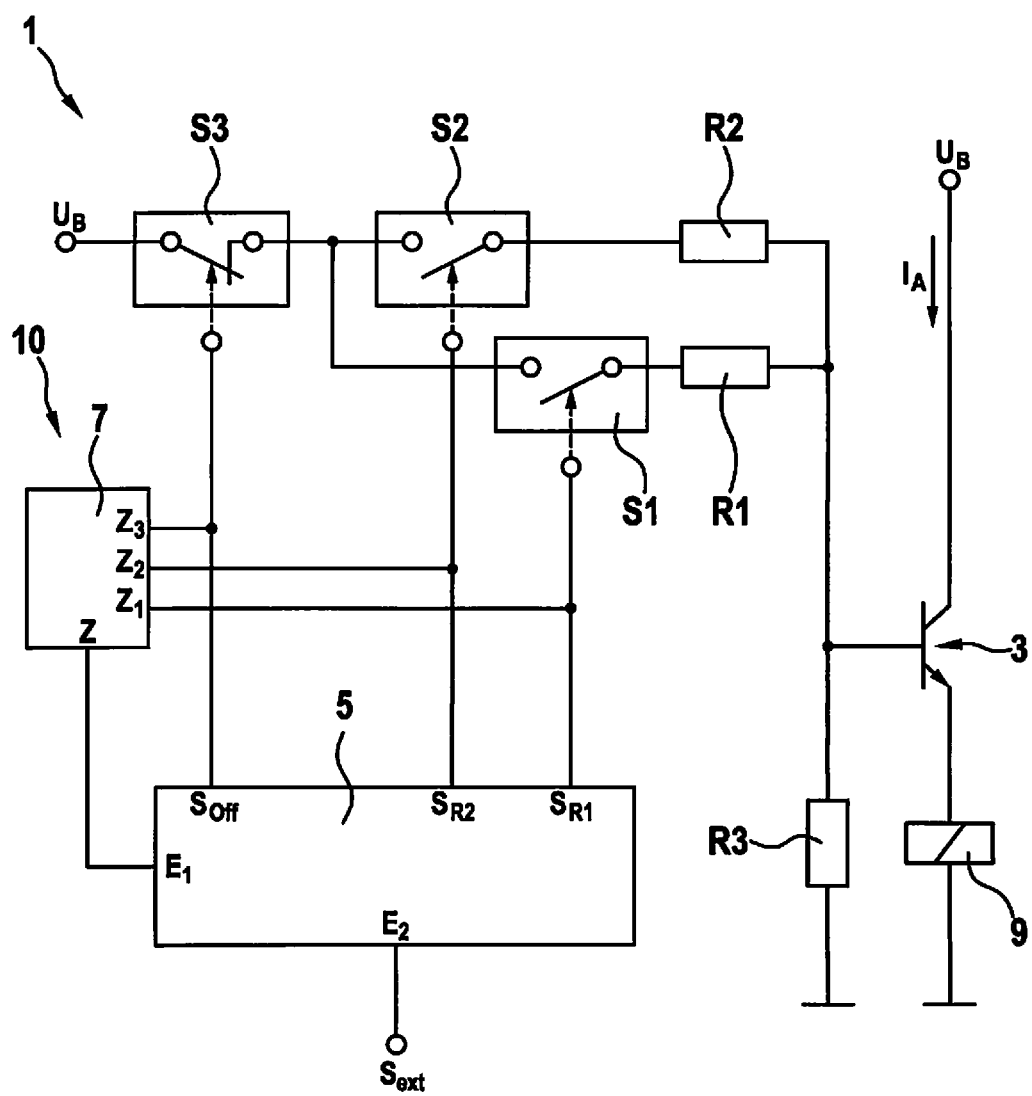
FIG. 1 shows a schematic block diagram of one exemplary embodiment of a control device of an electro-magnetic actuator for a restraint device according to the present invention.
Figure 2:
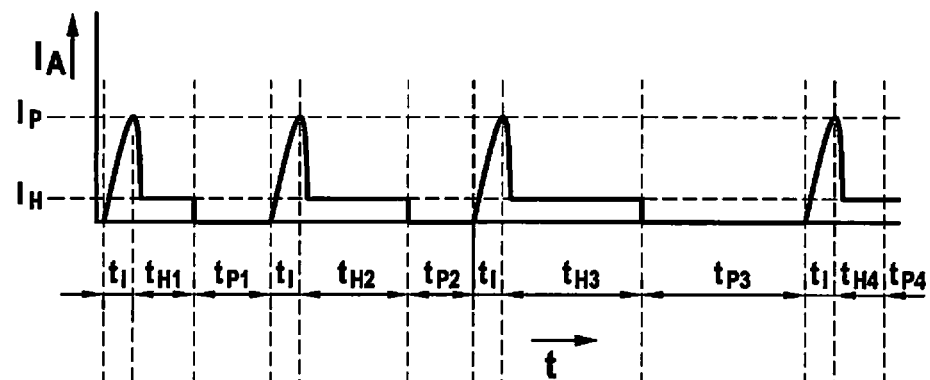
FIG. 2 shows the curve of an actuator current generated with the aid of the control device according to the present invention, according to FIG. 1.
Figure 3:
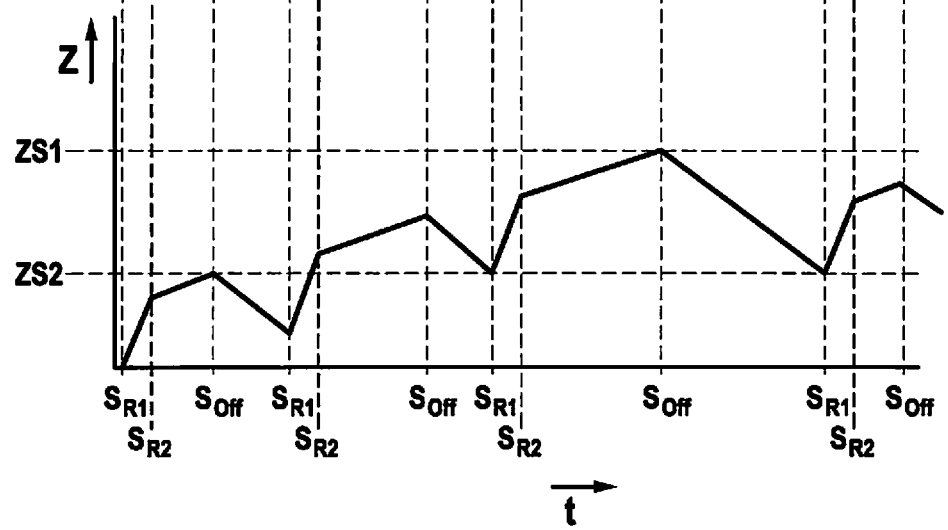
FIG. 3 shows the curve of the counter content of a counter for the control device according to the present invention, according to FIG. 1.

As is apparent from FIGS. 1 through 3, the represented exemplary embodiment of a control device 1 according to the present invention of an electromagnetic actuator 9 for a restraint device, which is not represented in greater detail, includes an evaluation and control unit 5 which generates at least one control signal $S_{R1}$, $S_{R2}$, $S_{Off}$ as a function of a triggering decision which was reached, the control signal determining the chronological sequence of the control of actuator 9 and predefines a control sequence having at least one control time period $t_1$, $t_{H1}$, $t_{H2}$, $t_{H3}$, $t_{H4}$, in which actuator 9 is activated, and at least one pause time period $t_{P1}$, $t_{P2}$, $t_{P3}$, $t_{P4}$, in which actuator 9 is deactivated. According to the present invention, a protective circuit 10 including a counter 7 is provided, the counter monitoring the control sequence and increments its counter content Z during the at least one control time period $t_1$, $t_{H1}$, $t_{H2}$, $t_{H3}$, $t_{H4}$ and decrements its counter content during the at least one pause time period $t_{P1}$, $t_{P2}$, $t_{P3}$, $t_{P4}$. In this case, protective circuit 10 effectuates a deactivation of actuator 9 when counter content Z reaches or exceeds a predefined first threshold value ZS1, and allows a reactivation of actuator 9 when counter content Z reaches or falls below a predefined second threshold value ZS2 after reaching or exceeding first threshold value ZS1, first counter content ZS1 being greater than second counter content ZS2.

As is further apparent from FIGS. 1 through 3, the at least one control time period corresponds to one pulse duration $t_1$ or one dwell time duration $t_{H1}$, $t_{H2}$, $t_{H3}$, $t_{H4}$. Evaluation and control unit 5 closes a first switch S1 with the aid of a first control signal $S_{R1}$ and generates a pulse-shaped actuator current $I_A$, via a first resistor R1 in combination with a further resistor R3 and a supply voltage $U_B$ in a first phase, in an output stage 3 which activates electromagnetic actuator 9. Simultaneously, first control signal $S_{R1}$ is present at a first input Z1 of counter 7. Due to control signal SR1 present at first input Z1, a first counting stage is set, which counter 7 uses for incrementing counter content Z.

As is further apparent from FIGS. 1 through 3, evaluation and control unit 5 closes a second switch S2 with the aid of a second control signal $S_{R2}$ and generates a constant actuator current $I_A$ having a predefined value $I_H$, via a second resistor R2 in combination with further resistor R3 and supply voltage $U_B$ in a second phase, in output stage 3 when pulse-shaped actuator current $I_A$ has reached a predefined first threshold value $I_P$. Constant actuator current $I_A$ holds actuator 9 in the activated state. Simultaneously, second control signal $S_{R2}$ is present at a second input Z2 of counter 7. Due to control signal $S_{R2}$ present at second input Z2, a second counting stage is set, which counter 7 uses for incrementing counter content Z.

As is further apparent from FIGS. 1 through 3, evaluation and control unit 5 opens a third switch S3 with the aid of a third control signal $S_{Off}$ and deactivates actuator 9 in a third phase. Simultaneously, third control signal $S_{Off}$ is present at a third input Z3 of counter 7. Due to control signal $S_{Off}$ present at third input Z3, a third counting stage is set, which counter 7 uses for decrementing counter content Z.

Counter 7 is installed for monitoring the load of the control device. Counter content Z of counter 7 is incremented or decremented by the associated counting stage in a fixed time interval, as a function of the present phase.

When a predefined first threshold value ZS1, which represents a switch-off threshold, is reached or exceeded, output stage 3 is then automatically switched off. If counter content Z reaches or falls below second threshold value ZS2, which represents a restart threshold, after output stage 3 and electromagnetic actuator 9 have been switched off, a reactivation of output stage 3 and electromagnetic actuator 9 is again permitted.

As is further apparent from FIGS. 1 through 3, counter 7 increments counter content Z during each of the first phases, each of which corresponds to pulse duration $t_1$, by a high first counting stage. During each of the second phases, each of which corresponds to a dwell time duration $t_{H1}$, $t_{H2}$, $t_{H3}$, $t_{H4}$, counter 7 increments counter content Z by a smaller second counting stage. In the exemplary embodiment shown, the ratio of the second counting stage to the first counting stage corresponds to the ratio of constant holding current $I_H$ to amplitude $I_P$ of the pulsed activation current. Therefore, the first counting stage has a value, for example, of 20, and the second counting stage then has a value of 2 when holding current $I_H$ has a value of approximately 10% of amplitude $I_P$ of the pulsed activation current. The third counting stage for decrementing counter content Z is selected in accordance with the possible thermal cooling. In the exemplary embodiment shown, the third counting stage is selected as a function of the thermal resistance of control device 1. According to one possible optimization, the value for the third counting stage for decrementing counter content Z per unit of time is varied as a function of the instantaneous temperature in the control device. Evaluation and control unit 5 outputs the sequence of control signals $S_{R1}$, $S_{R2}$, $S_{Off}$ for generating a desirable control sequence having at least one control time period $t_1$, $t_{H1}$, $t_{H2}$, $t_{H3}$, $t_{H4}$, in which actuator 9 is activated, and at least one pause time period $t_{P1}$, $t_{P2}$, $t_{P3}$, $t_{P4}$ in the exemplary embodiment shown, in response to an external control signal $S_{ext}$.

As is further apparent from FIGS. 1 through 3, output stage 3 and, therefore, electromagnetic actuator 9, are switched off when counter content Z reaches or exceeds first threshold value ZS1 acting as the switch-off threshold. In this case, the counter may output, due to an internal comparison, a corresponding switch-off signal to evaluation and control unit 5 which generates and outputs third control signal $S_{Off}$ in response to the received switch-off signal. If counter content Z reaches or falls below predefined second threshold value ZS2 acting as a restart threshold, an activation of output stage 3 and of electromagnetic actuator 9 is again permitted. In this case, the counter may output, due to an internal comparison, a corresponding restart signal to evaluation and control unit 5 which terminates the output of third control signal $S_{Off}$ in response to the received restart signal. Alternatively, the counter may only output counter content Z to evaluation and control unit 5. Evaluation and control unit 5 then carries out the corresponding comparisons with threshold values ZS1, ZS2.

In the exemplary embodiment shown, evaluation and control unit 5 generates different actuator currents $I_A$ via switches S1, S2 and deactivates actuator 9 via third switch S3. This advantageously allows for a simple and cost-effective implementation of control device 1, according to the present invention, of an electromagnetic actuator 9 for a restraint means. Of course, those skilled in the art may implement suitable technical approaches other than switches S1, S2, S3 for generating different actuator currents $I_A$; for example, different current sources may also be used for generating different actuator currents $I_A$.

Specific embodiments of control device 1 according to the present invention may be used, for example, for controlling an electromagnetic actuator 9 designed as a solenoid valve, via which a restraint means designed as an airbag may be filled with a cold gas. The number of the control time periods $t_1$, $t_{H1}$, $t_{H2}$, $t_{H3}$, $t_{H4}$ and the pause time periods $t_{P1}$, $t_{P2}$, $t_{P3}$, $t_{P4}$ within a predefined period of, for example, 50 ms, may then be predefined as a function of the desirable filling capacity of the airbag per unit of time.

What is claimed is:

1. A control device of an electromagnetic actuator for a restraint device, the control device comprising:
    an evaluation and control unit which is designed to generate at least one control signal as a function of a triggering decision which was reached, the control signal determining a chronological sequence of the control of the actuator and predefines a control sequence having at least one control time period in which the actuator is activated, and at least one pause time period in which the actuator is deactivated; and
    a protective circuit including a counter, the counter configured to monitor the control sequence, to increment its counter content by a first count value during the at least one control time period, and to decrement its counter content by a second count value during the at least one pause time period, the protective circuit designed to effectuate a deactivation of the actuator when the counter content reaches or exceeds a predefined first threshold value, and allow a reactivation of the actuator when the counter content reaches or falls below a predefined second threshold value after reaching or exceeding the first threshold value, the first threshold value being greater than the second threshold value.

2. The control device as recited in claim 1, wherein the at least one control time period corresponds to a pulse duration or a dwell time duration.

3. The control device as recited in claim 2, wherein the evaluation and control unit is designed to generate, with the aid of a first control signal, a pulse-shaped actuator current, which activates the actuator.

4. The control device as recited in claim 3, wherein the evaluation and control unit is designed to generates, with the aid of a second control signal, a constant actuator current having a predefined value when the pulse-shaped actuator current reaches a predefined first threshold value, the constant actuator current holding the actuator in the activated state.

5. The control device as recited in claim 4, wherein the evaluation and control unit is designed to deactivate the actuator with the aid of a third control signal.

6. The control device as recited in claim 1, wherein the electro-magnetic actuator is a solenoid valve, via which a restraint device, which is an airbag, is fillable with a cold gas, a number of the control time periods and the pause time periods within a predefined time period being predefinable as a function of the desirable filling capacity of the airbag per unit of time.

7. A control device of an electromagnetic actuator for a restraint device, the control device comprising:
    an evaluation and control unit which is designed to generate at least one control signal as a function of a triggering decision which was reached, the control signal determining a chronological sequence of the control of the actuator and predefines a control sequence having at least one control time period in which the actuator is activated, and at least one pause time period in which the actuator is deactivated; and a protective circuit including a counter which monitors the control sequence and increments its counter content during the at least one control time period and decrements its counter content during the at least one pause time period, the protective circuit designed to effectuate a deactivation of the actuator when the counter content reaches or exceeds a predefined first threshold value, and allow a reactivation of the actuator when the counter content reaches or falls below a predefined second threshold value after reaching or exceeding the first threshold value, the first threshold value being greater than the second threshold value;

wherein the at least one control time period corresponds to a pulse duration or a dwell time duration, and wherein the counter increments the counter content during the pulse duration by a predefined first counting stage and, during the dwell time duration, by a predefined second counting stage which is smaller than the first counting stage.

8. The control device as recited in claim 7, wherein the first counting stage is dependent on the predefined first threshold value of the pulse-shaped actuator current, and the second counting stage is dependent on the predefined value of the constant actuator current.

9. The control device as recited in claim 8, wherein the counter decrements the counter content during the pause duration by a third counting stage.

10. The control device as recited in claim 9, wherein the third counting stage is dependent on at least one of: i) a thermal resistance of the control device, and ii) an instantaneous temperature of the control device.

* * * * *